US008549549B2

(12) United States Patent
Matsumoto et al.

(10) Patent No.: US 8,549,549 B2
(45) Date of Patent: Oct. 1, 2013

(54) OPTICAL DISK DEVICE HAVING AN AIR FLOW SHIELDING PORTION

(75) Inventors: Koji Matsumoto, Tokyo (JP); Yosuke Ishizuka, Kawasaki (JP)

(73) Assignee: Hitachi-LG Data Storage, Inc., Tokyo (JP)

( * ) Notice: Subject to any disclaimer, the term of this patent is extended or adjusted under 35 U.S.C. 154(b) by 510 days.

(21) Appl. No.: 12/582,749

(22) Filed: Oct. 21, 2009

(65) Prior Publication Data

US 2010/0103792 A1   Apr. 29, 2010

(30) Foreign Application Priority Data

Oct. 24, 2008   (JP) .................................. 2008-274110

(51) Int. Cl.
*G11B 33/14* (2006.01)
(52) U.S. Cl.
USPC ........................................................ 720/648
(58) Field of Classification Search
USPC ... 361/679.33–679.39, 724–727; 174/17 GF, 174/17 CT, 50; 720/646–655, 657; 220/3.94
See application file for complete search history.

(56) References Cited

U.S. PATENT DOCUMENTS

| 6,355,877 | B1 | 3/2002 | Watanabe |
| 6,388,980 | B2* | 5/2002 | Otani et al. .................... 720/603 |
| 2004/0042371 | A1* | 3/2004 | Lee .............................. 369/75.2 |
| 2007/0234374 | A1 | 10/2007 | Yamauchi et al. |

FOREIGN PATENT DOCUMENTS

| JP | 2000-294953 | 10/2000 |
| JP | 2003-036664 | 2/2003 |
| JP | 2007-280452 | 10/2007 |

* cited by examiner

*Primary Examiner* — Nathan Danielsen
(74) *Attorney, Agent, or Firm* — Antonelli, Terry, Stout & Kraus, LLP.

(57) ABSTRACT

Provided is an optical disk device, including a top case and a bottom case which constitute a housing having a substantially box shape in which: the top case includes, on one side thereof, a hook which engages with the bottom case; the bottom case includes an engaging portion which is provided with a cutout which engages with the hook; and a shielding portion for preventing an air flow passing through the cutout is provided in an inside of the cutout.

3 Claims, 4 Drawing Sheets

OPTICAL DISK DEVICE HAVING AN AIR FLOW SHIELDING PORTION

CLAIM OF PRIORITY

The present application claims priority from Japanese patent application JP 2008-274110 filed on Oct. 24, 2008, the content of which is hereby incorporated by reference into this application.

BACKGROUND OF THE INVENTION

This invention relates to an optical disk device, and more particularly, to a structure of a housing with sound insulation properties being improved.

An optical disk device, which reads and writes information on an optical disk such as a compact disk (CD), digital versatile disk (DVD), and Blu-ray disc (BD), has been thinner accordingly to miniaturization of a computer into which the optical disk device is installed. Therefore, there is a problem in which wind noise of the disk rotating within an inside of the optical disk device leaks easily to an outside of the optical disk device.

In order to solve this problem, there has been proposed an optical disk device (for example, see JP2003-36664A). Specifically, in this optical disk device, a covering member which prevents leakage of an air stream in a radial direction of the optical disk, which is generated with rotation of the optical disk, is provided to a passage through which the air stream leaks to an outside of a case.

SUMMARY OF THE INVENTION

As described above, in the conventional optical disk device, the wind noise which is generated by the rotating disk leaks easily to the outside of the optical disk device. Particularly, in a so-called slim drive having a thickness of 12.7 or 9.5 millimeters, the disk housed therein reaches a wing portion having a thinner thickness than that of a body portion. Therefore, there is a short distance between the rotating disk and a bottom case and the wind noise which is generated by the rotation of the disk leaks easily to an outside of a housing.

In the above-mentioned slim drive, the wing portion is provided with an engaging portion which engages the bottom case and a top case with each other. The engaging portion of the top case is provided with a hole for engaging a hook. This engaging portion is provided at a position which is close to the disk, and hence the wind noise leaks easily through the hole of the engaging portion. Therefore, there is a need for reducing the leakage of the wind noise through this engaging portion.

In addition, in JP2003-36664A mentioned above, the covering member which prevents the leakage of the wind noise is provided as a separate member, and hence a cost of the optical disk device increases for improvement of sound insulation properties. Thus, there is a need for preventing the leakage of the wind noise through the case without using the separate member.

This invention has been made for providing an optical disk device which is capable of reducing wind noise which leaks through a housing without increasing a cost.

A representative aspect of this invention is as follows. That is, there is provided an optical disk device, including a top case and a bottom case which constitute a housing having a substantially box shape in which: the top case includes, on one side thereof, a hook which engages with the bottom case; the bottom case includes an engaging portion which is provided with a cutout which engages with the hook; and a shielding portion for preventing an air flow passing through the cutout is provided in an inside of the cutout.

According to an aspect of this invention, it is possible to reduce the wind noise which leaks through the housing without increasing a manufacturing cost of the housing.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

Figure 1:
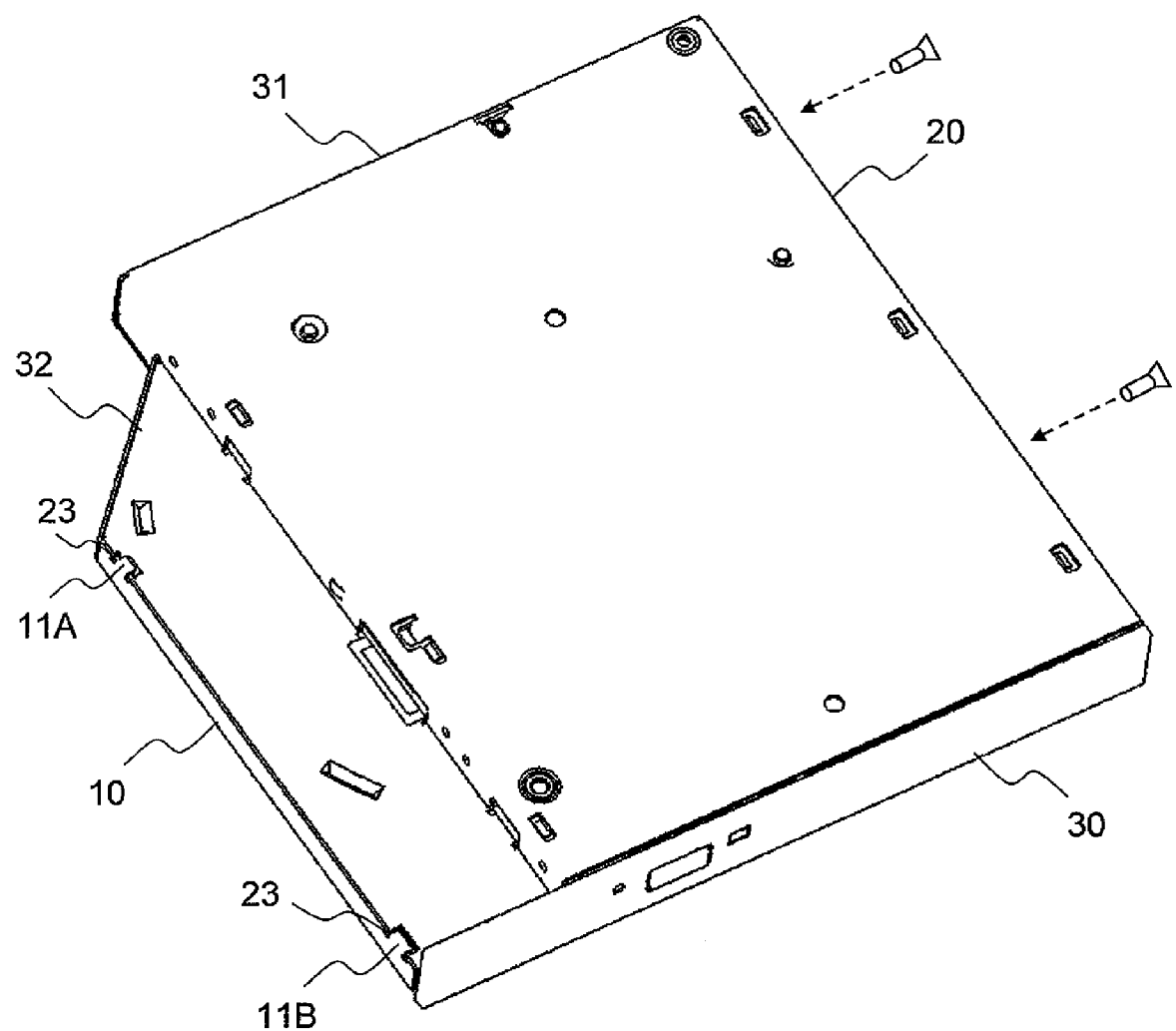
FIG. 1 is a perspective view illustrating an external appearance of an optical disk device according to an embodiment of this invention.

FIG. 1 is a perspective view illustrating an external appearance of an optical disk device according to an embodiment of this invention.

In an optical disk device according to this embodiment, a top case 10 and a bottom case 20 constitute a housing having a substantially box shape.

The housing illustrated in FIG. 1 is a so-called slim case which is separated into a body portion 31 having a large thickness and a wing portion 32 having a smaller thickness than that of the body portion. In addition, a front panel 30 is attached to a front surface side (front side) of the housing. The front panel 30 is attached to a tray on which a disk is loaded. The tray slides within the housing so as to eject or insert the disk which is loaded on the tray. In other words, when the tray is housed within the housing, the front panel 30 abuts the housing.

The top case 10 is provided with hooks 11A and 11B on a wing side (on a left side in FIG. 1). The hooks 11A and 11B engage with cutouts 23 of the bottom case 20, respectively. The top case 10 and the bottom case 20 are fixed by screwing on an opposite side of the hooks 11A and 11B (on a right side in FIG. 1).

One of the cutouts 23, which engages with the hook 11A (cutout 23 on a rear surface side (rear side)), is provided with a shielding portion 25 (see FIG. 2) which is described hereinafter. It should be noted that another of the cutouts 23, which engages with the hook 11B (cutout 23 on the front surface side), may not be provided with the shielding portion 25. This is because the another of the cutouts 23, which engages with the hook 11B, is situated away from the disk, which causes an effect for reducing the wind noise by provision of the shielding portion 25 to be small. In addition, when the cutout 23 on the front side is provided with the shielding portion 25, the shielding portion 25 might interfere with the tray which slides to the outside of the housing or into the inside of the housing.

Figure 2:
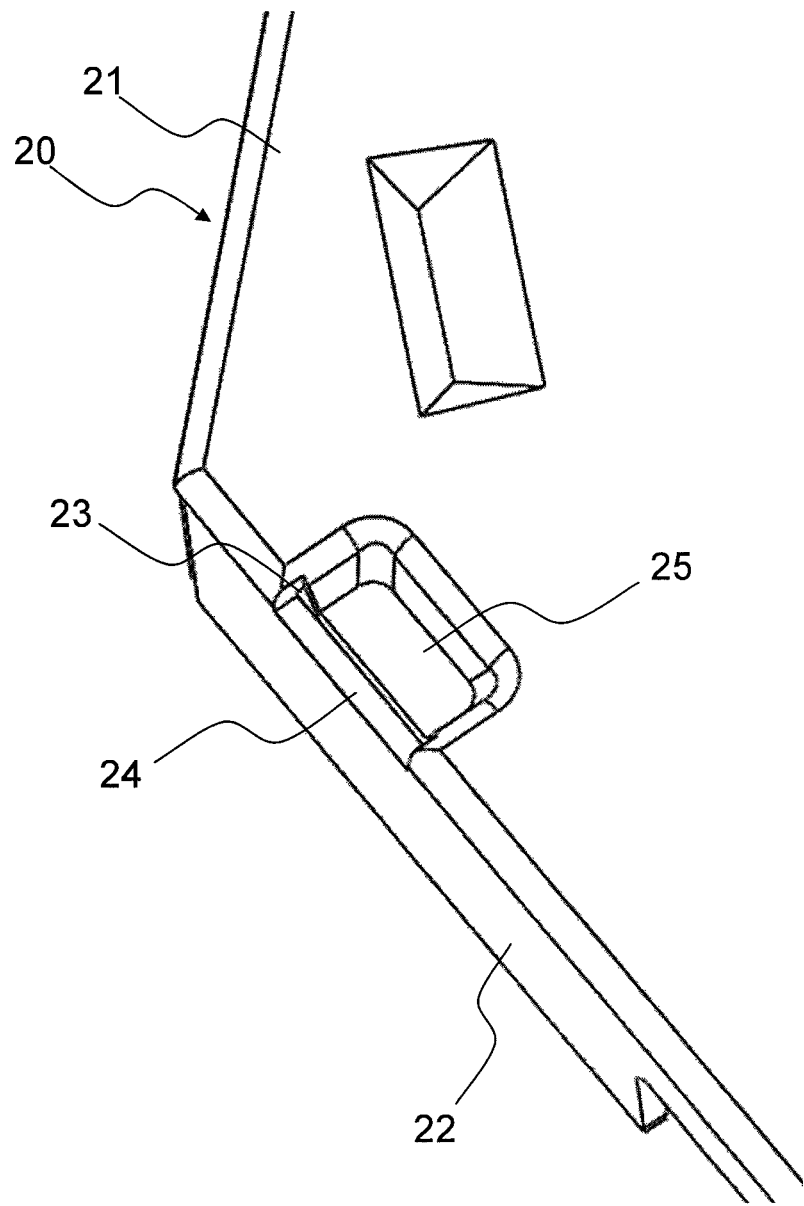
FIG. 2 is a perspective view illustrating an engaging portion on a rear side of the optical disk device according to the embodiment of this invention.

FIG. 2 is a perspective view illustrating an engaging portion on a rear side of the optical disk device according to the embodiment of this invention.

The engaging portion of the bottom case 20 which engages with the hook 11A of the top case 10 is constituted by the cutout 23 and the shielding portion 25.

The bottom case 20 is constituted by a bottom surface 21 which is made of a thin metal plate and a side surface 22 which is formed by bending the thin metal plate substantially perpendicularly with respect to the bottom surface 21. Then, on a side between the bottom surface 21 and the side surface 22, the cutout 23 is formed by cutting out a part which extends from the bottom surface 21 to the side surface 22. The hook 11A abuts, in the cutout 23, a cutting surface 24 of the side surface 22 and defines a height of the housing of the optical disk device (see FIG. 4). As described above, it is possible to suppress differences in the height of the housing by causing the hook 11A to abut the cutting surface 24 of the side surface 22 in comparison with a case in which the hook 11A abuts the surface which is constituted by bending the metal plate. This is because, an accuracy in a height dimension at an engaging position of the side surface 22 is enhanced in a case in which the end portion of the side surface 22 is formed by the cutting surface of the side surface 22 in comparison with a case in which an end portion of the side surface 22 is formed by bending the metal plate.

In an inside of the bottom surface 21, which is included within the cutout 23, there is provided the shielding portion 25 which includes a surface parallel with respect to the bottom surface 21. A plane surface of the shielding portion 25 is provided inside with respect to the cutting surface 23 so as not to interfere with the hook 11A when the top case 10 and the bottom case 20 are assembled. It is preferred that the shielding portion 25 be formed in the inside of the bottom surface 21 by drawing the bottom surface 21. The shielding portion 25 is formed by drawing, and hence three sides of the shielding portion 25 are integrated with the bottom surface 21. Therefore, a space of the bottom case 20 is only a slight space 26 (see FIG. 4) between an outer surface of the shielding portion 25 and the side surface 22.

The cutout 23 is formed by providing the bottom case 20 with a hole so as to engage with the hook 11, and hence air passing through this hole causes the wind noise of the disk to leak to the outside of the housing. However, according to this embodiment, the cutout 23 is provided with the shielding portion 25 which prevents an air flow, and hence the air (sound) passing through the cutout 23 decreases and it is possible to reduce the wind noise which leaks to the outside of the housing.

In addition, the shielding portion 25 is formed by drawing, and hence the space of the cutout 23 becomes smaller. Therefore, it is possible to further reduce the wind noise which leaks to the outside of the housing.

The shielding portion 25 may also be formed by bending other than by drawing. In this case, one side of the shielding portion 25 is integrated with the bottom surface 21 and, on other two sides of the shielding portion 25, there is provided a slit between the shielding portion 25 and the bottom surface 21.

Figure 3:
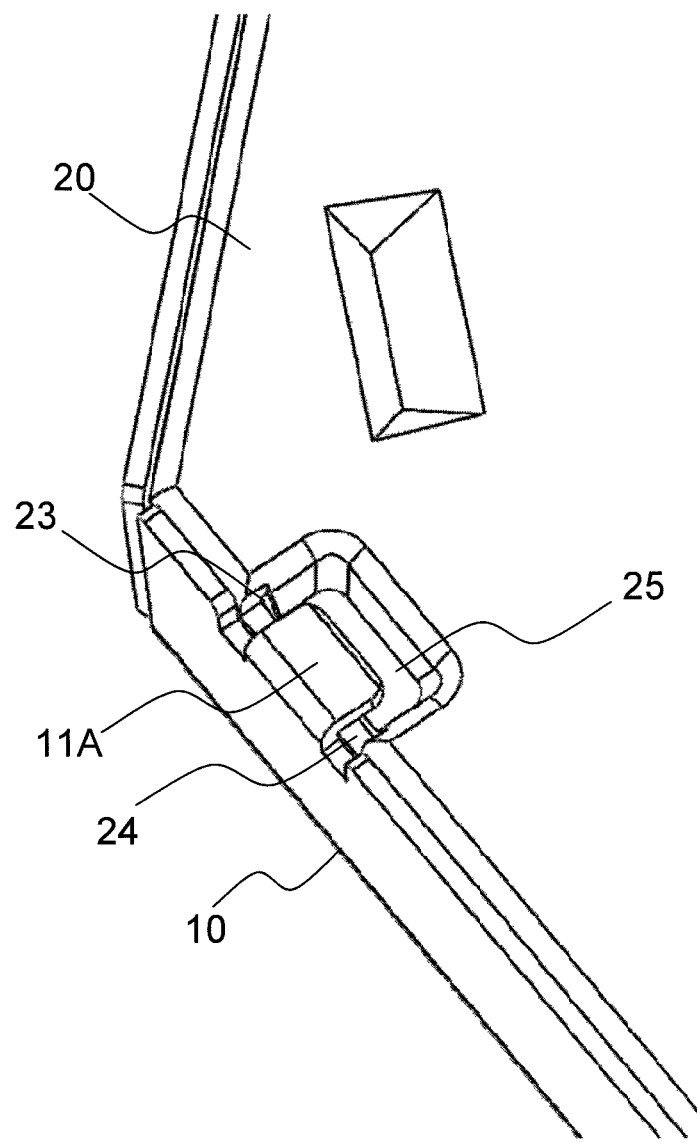
FIG. 3 is a perspective view illustrating an engaging state of the engaging portion on the rear side of the optical disk device according to the embodiment of this invention.

FIG. 3 is a perspective view illustrating an engaging state of the engaging portion on the rear side of the optical disk device according to the embodiment of this invention.

In a state in which the top case 10 and the bottom case 20 are assembled, the hook 11A engages with the cutout 23. The shielding portion 25 in the inside of the cutout 23 closes a most part of an air-gap around the hook 11A.

Figure 4:
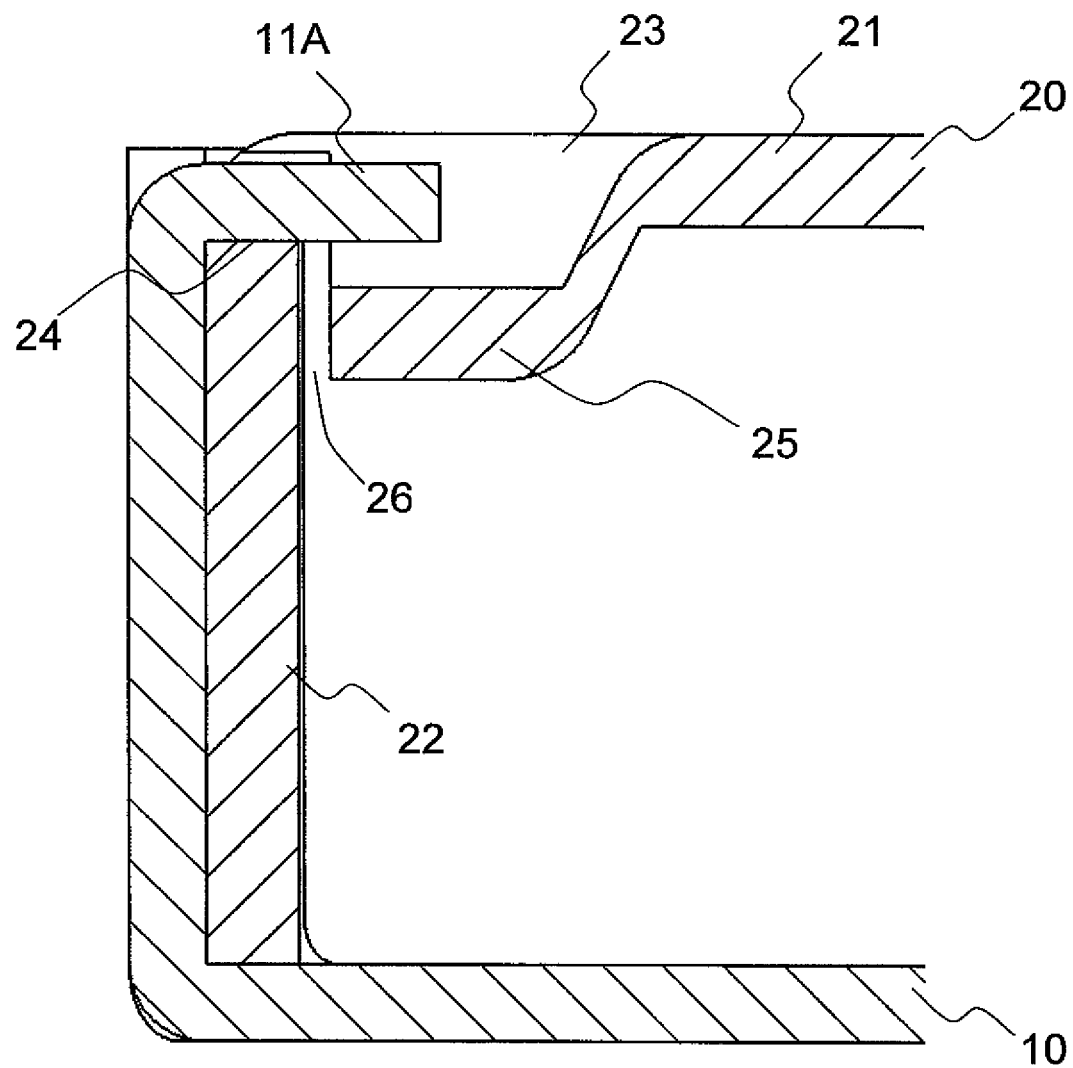
FIG. 4 is a sectional view illustrating an engaging portion of the optical disk device according to the embodiment of this invention.

FIG. 4 is a sectional view illustrating an engaging portion of the optical disk device according to the embodiment of this invention.

The cutout 23 is provided on a side which is constituted by a portion in which the bottom surface 21 and the side surface 22 of the bottom case 20 intersect with each other. The shielding portion 25, which is provided in the inside of the cutout 23, is provided in an inside of the bottom surface 21 and parallel with respect to the bottom surface 21. It should be noted that the shielding portion 25 is provided inside with respect to the cutting surface 24 of the side surface 22, and hence the hook 11A abuts the cutting surface 24 while the hook 11A does not abut the shielding portion 25.

Due to the provision of the shielding portion 25, the space between the top case 10 and the bottom case 20 is eliminated but for the space 26 between the shielding portion 25 and the side surface 22 of the bottom case 20. Therefore, the space between the top case 10 and the bottom case 20 becomes smaller, and hence it is possible to improve the sound insulation properties of the housing in comparison with a conventional example in which the entire cutout 23 constitutes the space.

As described in the foregoing, according to the embodiment of this invention, the shielding portion is formed by drawing, and hence it is possible to reduce the wind noise which leaks through the housing without increasing a manufacturing cost of the housing. For example, if the number of revolutions of the disk is 5,200 revolutions per minute, it is possible to reduce the wind noise by 0.5 decibels in comparison with a case in which the shielding portion 25 is not provided.

In addition, the space of the housing becomes smaller, and hence it is possible to reduce an electromagnetic wave which leaks through the optical disk device.

While the present invention has been described in detail and pictorially in the accompanying drawings, the present invention is not limited to such detail but covers various obvious modifications and equivalent arrangements, which fall within the purview of the appended claims.

What is claimed is:

1. An optical disk device, comprising a top case and a bottom case which constitute a housing having a substantially box shape, wherein:
    the top case comprises, on one side thereof, two hooks which engages with the bottom case;
    the bottom case comprises two engaging portions which are respectively provided with two cutouts which respectively engage with the two hooks;
    the house comprises:
        a body portion which has a substantially box shape; and
        a wing portion which has a smaller thickness than thickness of the body portion and extends from the body portion;
    the two engaging portions are provided in a front side and a rear side of the wing portion, respectively;
    a shielding portion for preventing an air flow passing through the cutout is provided in an inside of the housing, with the air flow being generated by rotating an optical disk;
    the shielding portion and the engaging portion are provided as the same member; and
    the shielding portion is provide in the engaging portion situating on the rear side of the wing portion.

2. The optical disk device according to claim 1, wherein: the bottom case comprises:
    a bottom surface which is made of a thin metal plate; and
    a side surface which is formed by bending the thin metal plate substantially perpendicularly;

the cutout is provided on a side between the bottom surface and the side surface by cutting out a part which extends the bottom surface to the side surface; and the shielding portion is formed by drawing the bottom surface.

3. The optical disk device according to claim 2, wherein the hook engages with a cutting surface of the side surface.

* * * * *